United States Patent
Thomas et al.

(10) Patent No.: US 11,343,127 B2
(45) Date of Patent: May 24, 2022

(54) METHOD FOR DEMODULATING DIGITAL SIGNALS USING MULTIPLE DIGITAL DEMODULATORS

(71) Applicants: SAFRAN DATA SYSTEMS, Courtaboeuf (FR); CENTRE NATIONAL D'ETUDES SPATIALES, Paris (FR)

(72) Inventors: Alain Thomas, Clamart (FR); Jean-Marc Leveau, Bievres (FR); Stanislas Augarde, Carrieres sur Seine (FR); Emmanuel Bouisson, Saint-Orens de Gameville (FR); Adrien Gay, Toulouse (FR)

(73) Assignees: SAFRAN DATA SYSTEMS, Courtaboeuf (FR); CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 17/254,696

(22) PCT Filed: Jun. 21, 2019

(86) PCT No.: PCT/EP2019/066450
§ 371 (c)(1),
(2) Date: Dec. 21, 2020

(87) PCT Pub. No.: WO2019/243565
PCT Pub. Date: Dec. 26, 2019

(65) Prior Publication Data
US 2021/0176103 A1    Jun. 10, 2021

(30) Foreign Application Priority Data

Jun. 21, 2018 (FR) ...................... 1855496

(51) Int. Cl.
*H04L 27/233* (2006.01)
*H04B 1/00* (2006.01)
(Continued)

(52) U.S. Cl.
CPC ....... *H04L 27/2338* (2013.01); *H04B 1/0003* (2013.01); *H04B 1/30* (2013.01); *H04L 7/06* (2013.01)

(58) Field of Classification Search
CPC .. H04B 1/0003; H04B 1/0007; H04B 1/0014; H04B 1/16; H04B 1/30; H04L 7/0079;
(Continued)

(56) References Cited

U.S. PATENT DOCUMENTS

| | | | |
|---|---|---|---|
| 8,385,305 B1 | 2/2013 | Negus et al. | |
| 2010/0135432 A1* | 6/2010 | Miyoshi | H04L 25/03159 375/295 |

(Continued)

FOREIGN PATENT DOCUMENTS

| | | |
|---|---|---|
| EP | 1 278 345 A1 | 1/2003 |
| EP | 1 292 062 A1 | 3/2003 |
| FR | 3 082 970 B1 | 5/2020 |

OTHER PUBLICATIONS

Kubo et al., "A Parellel Blind Demodulator in the Presence of Intersymbol Interference," IEEE International Conference on Communications, 2001, pp. 2520-2524, 5 pages total.
(Continued)

*Primary Examiner* — Young T. Tse
(74) *Attorney, Agent, or Firm* — Birch, Stewart, Kolasch & Birch, LLP

(57) ABSTRACT

Method for processing a sequence of digital signal samples including a first sub-sequence and a second sub-sequence. Forming a first block of samples comprising the first sub-sequence and a second block of samples comprising header
(Continued)

samples followed by the second sub-sequence. Demodulating the first block of samples through a digital demodulator to produce a first block of symbols, and the second block of digital signal samples through a second digital demodulator to produce a second block of symbols. The second demodulator implementing a carrier synchronisation or symbol rate synchronisation starting with the header samples, which comprise samples in a number adapted in such a way that the synchronisation is effective before the second demodulator demodulates the second sub-sequence. Reconstructing a sequence of symbols by concatenating the first symbol block with the second symbol block.

16 Claims, 4 Drawing Sheets

(51) Int. Cl.
*H04L 7/06* (2006.01)
*H04B 1/30* (2006.01)

(58) Field of Classification Search
CPC ... H04L 7/06; H04L 7/10; H04L 27/06; H04L 27/063; H04L 27/14; H04L 27/22; H04L 27/2338

USPC ....... 375/324–326, 340, 343, 349, 355, 362, 375/364; 370/509–513
See application file for complete search history.

(56) References Cited

U.S. PATENT DOCUMENTS

| | | | |
|---|---|---|---|
| 2010/0290543 A1* | 11/2010 | Iwai | H04L 1/007 375/259 |
| 2012/0201332 A1* | 8/2012 | Vapillon | H04L 27/2685 375/340 |
| 2019/0281564 A1* | 9/2019 | Yang | H04W 74/0833 |

OTHER PUBLICATIONS

Luecke el al., "Programmable Digital Communications Receiver Architecture for High Data Rate Avionics and Ground Applications," Interstate Electronics Corporation, 1990, pp. 552-556, 5 pages total.

* cited by examiner

METHOD FOR DEMODULATING DIGITAL SIGNALS USING MULTIPLE DIGITAL DEMODULATORS

FIELD OF THE INVENTION

The present invention relates to the field of digital demodulation of signals.

PRIOR ART

In a manner known per se, a digital demodulator takes as input digital signal samples, these samples being for example obtained by digitization of an analog radio signal.

A digital demodulator can be implemented in hardware or software form.

For example, an Application-Specific Integrated Circuit (ASIC) or else a programmable logic circuit (such as an FPGA) can be used as a hardware digital demodulator. These circuits both share the property of being dedicated to demodulation. With such circuits, it is possible to achieve very high demodulation throughputs. However, these logic circuits have many drawbacks: they of course require a dedicated hardware configuration that requires considerable development and qualification time, at start-up and in the event of updates. Their architecture is designed to process a continuous stream of samples at the input and has a maximum throughput characteristic. It is currently not possible to run several hardware digital demodulators in parallel for the purpose of increasing throughput except for special cases of "burst" modulation or pilot-symbol assisted modulation, no more than it is possible to share one to process several carriers of lower throughput.

A software digital demodulator is a computer program dedicated to digital demodulation and is able to be executed by a generic processor, i.e. a processor not specifically designed for this task. A known example of a software digital demodulator is GNU Radio.

The heavy restrictions on implementation, "modularity" and porting that are encountered with a hardware digital demodulator are removed when a software digital demodulator is used.

However, the maximum demodulation throughput that can be achieved by a generic processor executing such a program is limited and proportional to its clock frequency, given the fact that the samples are processed sequentially. Thus, there is still a maximum throughput that cannot be exceeded by a single software demodulator.

It could be envisioned to use several software digital demodulators in parallel to raise this throughput limit. However, the use of several digital demodulators, even software ones, causes a new problem to appear.

To understand this problem, it should be recalled that a digital demodulator must perform a synchronization of carrier and/or symbol rate on the basis of digital signal samples that it receives as input before being able to produce demodulated symbols from samples. Such a synchronization is in certain implementations implemented by means of a phase-locked loop (PLL). Whatever the chosen implementation, it is only once this synchronization is effective that the digital demodulator can start to convert digital signal samples received as input into demodulated symbols. Furthermore, the digital demodulator must consume digital signal samples to successfully complete this synchronization. Thus, symbols corresponding to digital signal samples consumed by the digital demodulator before the synchronization is effective are of necessity lost, or at least productive of symbols with a sub-optimal error probability.

In a conventional architecture with a single digital demodulator, the loss of a few initial symbols from a signal caused by the time taken by the demodulator to synchronize itself on the input samples that it receives is not very damaging. This is because, once the synchronization is effective, this loss is not repeated.

In an architecture comprising several independent digital demodulators working in parallel, things would be very different. If a digital input signal to be demodulated was divided into blocks of samples and these blocks were processed in parallel by the different digital demodulators, it would then be necessary for each digital demodulator to implement a new synchronization on a new block it receives. Consequently, the number of signal symbols lost would increase with the number of digital demodulators used in parallel, and the losses would be repeated with each block demodulated.

The invention in question proposes to solve this problem while preserving the parallel computing power.

SUMMARY OF THE INVENTION

One aim of the invention is to digitally demodulate a signal with an increased throughput, without loss of symbols, or more generally to optimize the computing power required at a given throughput.

Provision is thus made, according to a first aspect of the invention, for a method for processing a sequence of digital signal samples coming from at least one modulated analog signal, the sample sequence comprising a first sample sub-sequence and a second sample sub-sequence separate from the first sample sub-sequence, the method comprising steps of:

forming a first sample block comprising the first sample sub-sequence, and a second sample block comprising header samples followed by the second sample sub-sequence, demodulating the first block of digital signal samples by a first digital demodulator, so as to produce a first symbol block, demodulating the second block of digital signal samples by a second digital demodulator independent of the first digital demodulator so as to produce a second symbol block, the second digital demodulator implementing a carrier and/or symbol rate synchronization, and taking as input the second sample block starting with the header samples, the header samples comprising a suitable number of synchronization samples for the synchronization to be effective before the second digital demodulator starts to demodulate the second sample sub-sequence, reconstructing an output symbol sequence by concatenating a symbol sequence coming from the first symbol block with a symbol sequence coming from the second symbol block.

Moreover, the first sample sub-sequence comprises tail samples of the first sample block, and the header samples of the second sample block correspond to the tail samples. In other words, there is an overlap between the end of the first sample block processed by the first digital demodulator and the start of the second sample block processed by the second digital demodulator. The fact of using an overlap between the last samples of the first sample block and the header samples of the second sample block has the advantage of being particularly simple to implement.

As the two digital demodulators are independent, they can be used in parallel to demodulate the blocks that are supplied to them. Using them in conjunction therefore makes it possible to obtain a higher demodulator throughput in a less expensive way than by increasing the power of a single demodulator.

In addition, thanks to the presence of the header samples, the carrier and/or symbol rate synchronization is effective before the second digital demodulator starts to demodulate the second sub-sequence of samples contained in the second sample block. This makes it possible to avoid certain symbols being missing from the output signal when it is finally reconstructed.

The method according to the first aspect of the invention can be completed using the following features taken alone or in combination when this is technically possible.

The header samples can further comprise guard samples (E7-E9) located, in the second sample block, between the synchronization samples (E6) and the second sample sub-sequence (E10-E14), the guard samples being of a number greater than a maximum number of samples per symbol in the sequence of digital signal samples. To understand the effect provided by these features, it should be recalled that the sampling of the modulated analog signal is asynchronous, i.e. its rate is governed by a clock independent of the transmitter, and that the number of samples per analog signal sample can vary over time (in particular by Doppler effect, when the analog signal has been transmitted by a transmitter then acquired by a receiver in relative motion with respect to the transmitter). Consequently, the number of header samples consumed by synchronization can also vary. The guard samples then have the effect of guaranteeing that no symbol contained in the second sample set will be consumed by the loop before being locked even in these situations.

The second digital demodulator having received the second sample block can be configured to not produce symbols as long as the header samples have not been consumed by the second demodulator.

The method can comprise the generation, by the first digital demodulator, of a first set of metadata relating to the first symbol block, and the generation, by the second digital demodulator, of a second set of metadata relating to the second symbol block, wherein the reconstruction is implemented using the first set of metadata and the second set of metadata.

The method can further comprise steps of detecting a redundancy between at least one symbol of the first symbol block and at least one symbol of the second symbol block, using the first set of metadata and the second set of metadata, and retaining in the output sequence only one out of two symbols detected as being redundant. These steps make it possible to avoid the appearance of redundant symbols in the output signal, whatever the size chosen for the sample blocks processed by the first digital demodulator and the second digital demodulator respectively.

In a first variant, the method comprises the estimation of a signal-to-noise ratio associated with the first symbol block, and a signal-to-noise ratio associated with the second symbol block, the symbol retained in the output signal out of two redundant symbols being the one that comes from the symbol block associated with the highest signal-to-noise ratio out of the two estimated signal-to-noise ratios. This has the effect of minimizing the risk of errors being present in the included symbol.

In a second variant, the symbol retained in the output sequence out of two symbols detected as being redundant is the redundant symbol of the first symbol block, it being understood that the symbol sequence coming from the second symbol block follows the symbol sequence coming from the first symbol block in the output symbol sequence.

Provision can furthermore be made for the following features:
the first set of metadata comprises a first position determined by the first demodulator and making it possible to locate the final symbol in the first sample block,
the second set of metadata comprises a second position determined by the first demodulator and making it possible to locate the initial symbol in the second sample block,
the number of redundant blocks between the first symbol block and the second symbol block is computed as a function of a separation between the first position and the second position.

The method can further comprise the generation, by the first digital demodulator, of a first frame comprising the first symbol block and the first set of metadata, and the generation, by the second digital demodulator, of a second frame comprising the second symbol block and the second set of metadata. The fact of including these positions in the frames that comprise the demodulated symbols has the advantage of requiring only a single linking of data from the digital demodulator to a reconstructing module implementing the reconstruction of the output signal.

The first set of metadata can form a suffix that follows the first symbol block in the first frame, and the second set of metadata can form a prefix followed by the second symbol block in the second frame. The fact of placing the metadata in the prefix and in the suffix of the frames also comprising demodulated symbols has the advantage of reducing the latency phenomena induced by implementing demodulations in parallel. The reconstructing module in charge of reconstructing the output signal is in particular capable of detecting any redundancy between the first symbol block and the second symbol block without having received the entirety of the second frame.

The method can further comprise steps of:
estimating, by the first digital demodulator, a first synchronized carrier phase associated with the first symbol block,
estimating, by the second digital demodulator, a second synchronized carrier phase associated with the second symbol block,
if the two phases of synchronized carrier synchronization differ, adjusting one of the symbol blocks in relation to the other symbol blocks so as to eliminate this phase difference, before reconstructing the output signal.

These features have the effect of allowing the correct demodulation of samples coming from a signal previously modulated by a constellation having a phase ambiguity.

The first phase is for example included in the first set of metadata and the second phase is for example included in the second set of metadata.

The method can further comprise the generation of metadata relating to the second sample block formed, said metadata being transmitted to the second digital demodulator and comprising the total number of samples of the second sample block and/or the number of synchronization samples of the block and/or a center frequency of the sequence of digital signal samples. Owing to these metadata, the second digital demodulator is capable of determining autonomously if first samples coming from the set have been unduly consumed before the synchronization is effective, in other words if the header samples were in sufficient number to avoid symbol losses at the demodulator output. These metadata therefore offer the possibility for the second digital demodulator to itself escalate an alert or take any other appropriate measure, where applicable.

The method can comprise steps of:
  determining a frequency separation between a center frequency of the sequence of digital signal samples and an expected center frequency,
  correcting the sequence of digital signal samples according to the frequency separation to remove this separation in the sample sequence, before implementing the step of forming sample blocks, or else correcting one of the sample blocks by one of the digital demodulators.

As the correction is made before the forming of the sample blocks, this correction is done a single time per sample block to be processed. This solution is more economic of resources than that consisting in having the determination of the frequency separation or even the ensuing correction done by each of the digital demodulators used.

Provision is also made, according to a second aspect of the invention, for a computer program product comprising program code instructions for executing the steps of the method according to the first aspect of the invention, when this program is executed by at least one processor.

Provision is also made, according to a third aspect of the invention, for a device for processing a sequence of digital signal samples coming from at least one modulated analog signal, the sample sequence comprising a first sample sub-sequence and a second sample sub-sequence separate from the first sample sub-sequence, the processing device comprising:
  a distributor configured to form a first sample block comprising the first sample sub-sequence, and to form a second sample block comprising header samples followed by the second sample sub-sequence,
  a first digital demodulator configured to demodulate the first block of digital signal samples so as to produce a first symbol block,
  a second digital demodulator independent of the first digital demodulator and configured to demodulate the second block of digital signal samples so as to produce a second symbol block, the second digital demodulator being configured to implement a carrier and/or symbol rate synchronization, and to take as input the second sample block starting with the header samples, the header samples comprising synchronization samples in a suitable number for the synchronization to be effective before the second digital demodulator starts to demodulate the second sample sub-sequence,
  a reconstructing module configured to reconstruct an output symbol sequence by concatenating a symbol sequence coming from the first symbol block with a symbol sequence coming from the second block.

The first sample sub-sequence comprises tail samples of the first sample block, and the header samples of the second sample block correspond to the tail samples.

DESCRIPTION OF THE FIGURES

Other features, aims and advantages of the invention will become apparent from the following description, which is purely illustrative and non-limiting, and which must be read with reference to the appended drawings wherein.

In all the figures, similar elements bear identical reference numbers.

DETAILED DESCRIPTION OF EMBODIMENTS

1/Receiver of Modulated Analog Signals

Figure 1:
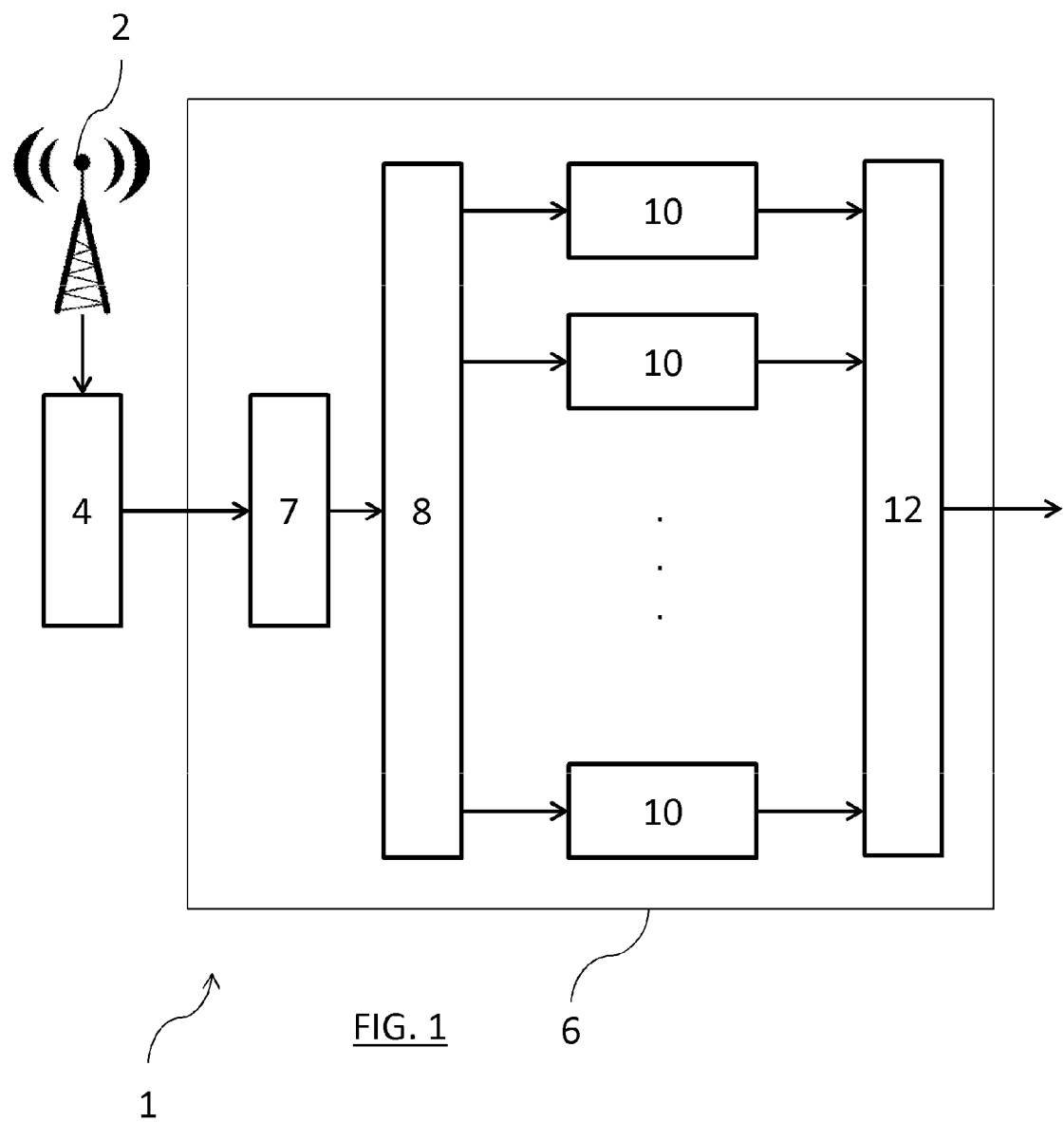
FIG. 1 schematically illustrates a receiver of modulated analog signals according to an embodiment of the invention.

With reference to FIG. 1, a receiver 1 coupled with a radio antenna 2, comprises an analog-to-digital converter 4 and a device 6 for processing digital signal samples.

The radio antenna 2 is suitable for acquiring an analog signal having been previously modulated by a remote transmitter.

The analog-to-digital converter 4 is configured to digitize the modulated analog signal acquired by the antenna 2, i.e. to produce a continuous stream of digital signal samples on the basis of this analog signal, itself a stream continuously divided into sequences of samples. The analog converter works at a predetermined sampling frequency.

The processing device 6 comprises a distributor 8, a plurality of digital demodulators 10, and a reconstructing module (or "serializer") 12.

The processing device 6 can also comprise a carrier frequency detecting and/or correcting module 7, which is preferably arranged upstream of the distributor 8. This detection module 7 has the function of estimating and where applicable correcting a center frequency error, for example by spectral analysis of the signal digitized by the analog-to-digital converter 4 (this processing being known to those skilled in the art).

The distributor 8 has the function of forming sample blocks from samples produced by the analog-to-digital converter.

The distributor 8 can thus comprise one or more buffer memories for storing signal samples and or signal sample blocks, and a processor for implementing the creation of the blocks.

The digital demodulators 10 are independent from one another and can thus consequently operate in parallel.

The digital demodulators 10 are preferably of "software" type. In other words, each digital demodulator comprises an executing unit such as for example a processor configured to execute a digital demodulation program.

For example a CPU or a GPU can be used as a digital demodulator 10 or as a set of several digital demodulators 10. Provision can be made for each demodulator to dispose of one or more processors; provision can also be made for more digital demodulators to correspond to several parallel tasks executed in a time period shared by one and the same processor.

The digital demodulators 10 can be identical or different.

Each digital demodulator 10 is arranged to receive a sample block formed by the distributor 8, and to produce a symbol block from this block. By convention, in this text, the term "symbol" implicitly refers to demodulated digital data, and the term "sample" implicitly refers to digital data that have not yet been demodulated.

The reconstructing module 12 is arranged to receive symbol blocks produced by the different digital demodulators. The main function of this reconstructing module 12 is to reconstruct a continuous sequence of transmitted symbols which, ideally, correspond to an original signal that has undergone modulation by a transmitter. For this purpose, the reconstructing module 12 comprises, for example, at least one processor and at least one buffer memory.

2/Method for Processing Modulated Analog Signals

Figure 2:
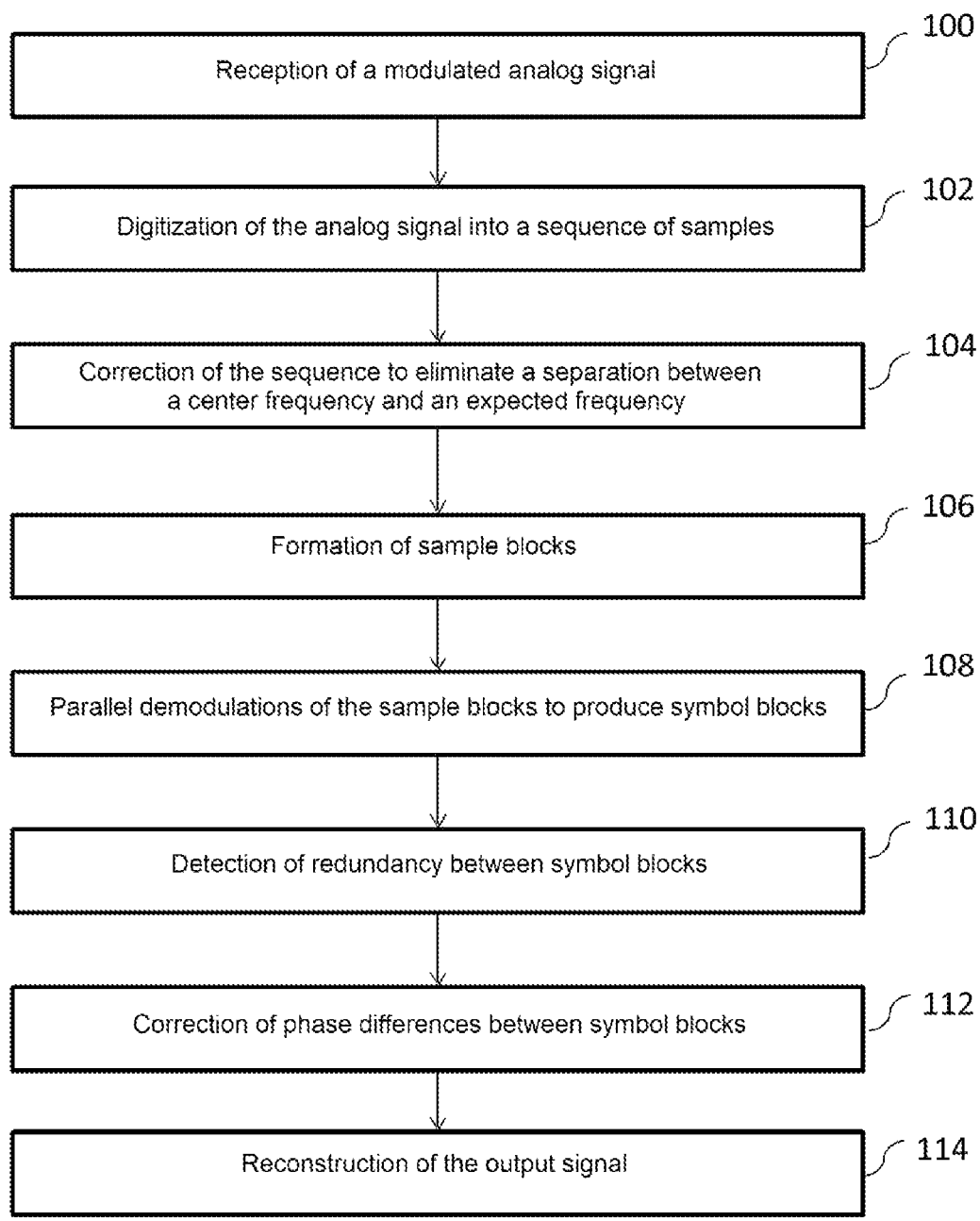
FIG. 2 is a block diagram of steps of a method for processing signals able to be implemented by the receiver of FIG. 1.

With reference to FIG. 2, the receiver 1 implements the following steps.

The radio antenna 2 acquires a previously modulated analog signal (step 100).

On the basis of this acquired signal, the analog-to-digital converter 4 produces a continuous stream of samples, this stream being able to itself be divided into sequences of digital signal samples (step 102).

In the following text is a description of the steps that are implemented and repeated for each sample sequence contained in the stream.

A frequency separation is determined between a center frequency of the sequence of digital signal samples and a center frequency expected by the receiver 1. A correction of the sequence of digital signal samples is then made to remove this separation in the sample sequence (step 104). In an embodiment, this correction is made by a frequency conversion in the detecting module 7, in another embodiment the digital demodulators 10 are informed of this center frequency by an item of metadata and initialize, for example, a PLL to this value.

Figure 3:
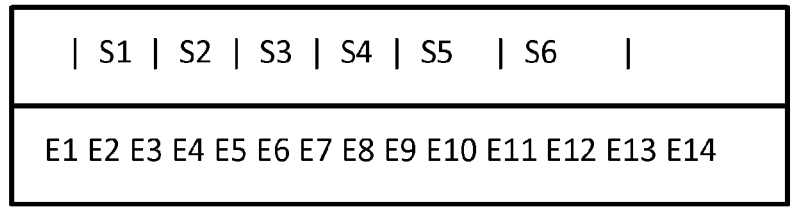
FIGS. 3 to 5 illustrate example data generated at different stages of the method, the block diagram of which is shown in FIG. 2.

The samples of the sequence are intended to undergo demodulation so as to obtain a symbol sequence. The sampling in the digitization function 4 does not have to be synchronous with the symbol rate, and the number of instantaneous samples included in a symbol period can vary between $E(Ts)$ and $E(Ts)+1$ where Ts is the symbol period counted in sample periods, wherein Ts is not an integer and E denotes an integer part. FIG. 3 thus shows an example of a sequence of 14 samples E1 to E14, on the basis of which only six symbols referenced S1 to S6 can be obtained by demodulation. In particular, the samples E2 and E3 are in the period of the symbol S1, and the samples E11, E12 and E13 are in the period of the symbol S6. In this example sequence, the average number of samples per symbol is 2.33.

The sample sequence (after any frequency correction) is supplied to the distributor 8.

Formally, the sample sequence can be partitioned into an ordered set of K different sample sub-sequences with indices ranging from 1 to K. By convention, these indices correspond to an order of reading of the sequence, i.e. the sub-sequence of index 1 is located at the head of the sequence, and the sub-sequence of index K is at the end of the sequence. If a single digital demodulator had to demodulate the complete sample sequence (which is not carried out during the method as will be seen below), this digital demodulator would first read the sub-sequence of index 1 and would finish by reading the sub-sequence of index K.

The distributor 8 forms K sample blocks from the sample sequence (step 106). The number K of blocks created is equal to the number of digital demodulators of the processing device that will be subsequently used.

As a general rule, each sample of the sequence received by the distributor 8 is found in at least one block formed by the distributor 8.

For any i ranging from 1 to K, the sample block of index i comprises header samples followed by the sub-sequence of samples of index i taken from the sample sequence received by the distributor 8.

The header samples of each sample block themselves come from the sample sequence received by the distributor 8.

The header samples comprise, in this order, synchronization samples and guard samples. The number of synchronization and guard samples are predetermined (below we will see that these numbers are chosen in a particular way).

The sample sub-sequence of index i immediately follows the guard samples in the sample block of index i.

Advantageously, for any i ranging from 2 to K, the header samples of the sample block of index i correspond to tail samples of the sample block of index i-1. In other words, there is an overlap between two sample blocks of respective indices i and i-1. Such an overlap is particularly advantageous as it drastically simplifies the implementation of the formation of the blocks by the distributor 8.

Figure 4:
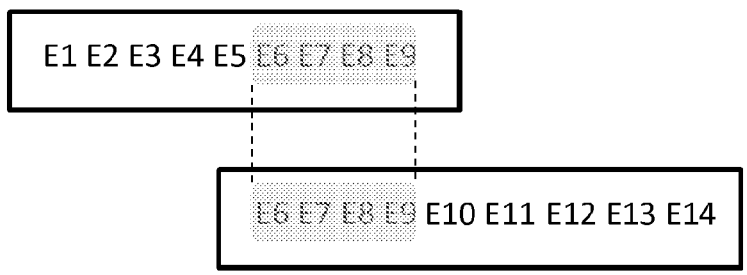

Take the example illustrated in FIG. 4, where two blocks (K=2) are formed on the basis of the sample sequence illustrated in FIG. 3. In this example a first block of index 1 (in the upper part of FIG. 4) formed by the distributor 8 comprises nine samples E1-E9, and a second block of index 2 (in the lower part of FIG. 4) formed by the distributor 8 comprises nine samples E6-14. The second sample block comprises four header samples E6 to E9 followed by a sub-sequence E10-E14 of five samples coming from the sample sequence E1-E14. The header samples E6-E9 comprise a single synchronization sample E6, followed by three guard samples E7-E9. It is observed that, in accordance with the advantageous variant embodiment described previously, there is an overlap between the two sample blocks formed since the four header samples E6-E9 of the second sample block (of index 2) correspond to the four tail samples of the first sample block (of index 1). This overlap is illustrated by the two dotted lines of FIG. 4.

The K blocks formed by the distributor 8 are then transmitted to the K different digital demodulators 10 of the processing device 6. By convention, the digital demodulator of index i is named as the demodulator receiving the sample block of index i.

For any i ranging from 1 to K, the digital demodulator 10 of index i implements the following steps.

Before being able to produce symbols, the digital demodulator 10 of index i makes a carrier and/or symbol rate synchronization on the basis of digital signal samples that it receives as input. This synchronization, known to those skilled in the art, is for example implemented by means of a phase-locked loop (PLL) or else any other means such as an automatic frequency control (AFC), or an estimator such as that of Classen-Meyr type, for example.

Two successive periods can be identified during the processing by the digital demodulator 10 of index i of the sample block of index i:
  a period of acquisition, during which the carrier and/or symbol rate synchronization implemented by the demodulator 10 is not yet effective, and during which samples of the sample block of index i are consumed by the demodulator 10, but without the demodulator producing correct symbols;
  a period of continuation, which starts from the time at which the synchronization is detected as being effective, and during which the demodulator 10 consumes as input other samples of the sample block of index i and produces symbols as output.

During the acquisition period, the digital demodulator 10 of index i starts by consuming the header samples, and more particularly the synchronization samples.

The number of synchronization samples of the sample block of index i is chosen such that the synchronization is effective—in other words the acquisition period is finished—before the digital demodulator 10 of index i starts to consume the sample sub-sequence of index i, located in the block after the header samples, to produce symbols. This makes it possible to avoid certain symbols of the original signal being lost or erroneous due to the fact that certain samples of this sub-sequence of index i are consumed by the demodulator during the acquisition period.

This number of synchronization samples is thus known to the distributor 8 and used by it to form the sample block of index i. This number of synchronization samples can be stored in a memory of the distributor 8 before its start. This number can where applicable be modified by the distributor 8 as a function of the analog signal picked up by the antenna 2.

To determine the number of synchronization samples, those skilled in the art can proceed as follows in the case, for example, of a synchronization by PLL of second order: those skilled in the art define an a loop band of available frequency $\omega_n$ compatible with a desired maximum variation of frequency and of expected signal-to-noise ratio (SNR) at the input of the receiver 1. The acquisition time is then of $2\pi/\omega_n$, where $\omega_n$ depends on (is a percentage of) the symbol rate. The header can then be computed in numbers of symbols transmitted. Let Nse the number of symbols transmitted. The knowledge of the frequency separation in the form of a ratio P of transmitter to receiver clock, after oscillator drift, Doppler effect etc. makes it possible to deduce therefrom the uncertainty P*RS on the rate RS at reception and makes it possible to deduce therefrom the size of the header in numbers of samples at reception Ne. This gives $$Ne=E[P*Nse*\text{oversampling}]+1$$

where "oversampling" is an integer oversampling factor.

In themselves, the synchronization samples suffice to avoid symbol losses caused by the inevitable existence of the acquisition period. However, another phenomenon can cause an omission of symbols that would not be generated by any digital demodulator. This is an interval problem that takes into account the fact that the digital demodulator, once locked, requires a minimum number of consecutive samples to compute a symbol. According to its relative position vis-a-vis a sampling period, this number can vary and we denote L this maximum length for all scenarios.

To remedy this problem, the number of guard samples is chosen such as to guarantee that any consecutive group of L samples is present in at least one block i, after removal of the synchronization samples. This makes it possible to guarantee that no symbol requires the use of synchronization samples to be generated.

The number of guard samples is, like the number of synchronization samples, known to the distributor 8 and used by the latter to form the sample blocks (the number of header samples being the sum of the number of synchronization samples and the number of guard samples). The number of guard samples can be stored in a memory of the distributor 8 before it is used. This number can where applicable be modified by the distributor 8 as a function of the analog signal picked up by the antenna.

To determine the number of guard samples, those skilled in the art can proceed as follows: the minimum number is L−1 where L is the size of the longest equivalent filter taking into account all the filters used in a cascade in the demodulator. In the simplest demodulator, $L=E(Ts)+1$ i.e. the filter is at least equal to the symbol duration.

The demodulator supplies as output a sequence of symbols until all the samples are consumed all the way to the end of the block. Three embodiments are envisioned for the start of the symbol sequence. In a first embodiment, the digital demodulator 10 generates symbols from the start of the consumption of the samples of the block, including during the acquisition period, but in this case, the first symbols generated affected by a sub-optimal error probability will not be used. In a second embodiment, the digital demodulator generates symbols only during the continuation period and not during the acquisition period; in this case the generated symbols are usable but the position of the first symbol is random vis-a-vis the start of the block. In a third embodiment, which is a preferred embodiment (and which will subsequently be referred to as the "silent header" embodiment), the digital demodulator 10 generates symbols from the moment it reaches the sub-sequence after consuming the header. In the latter case, all the symbols are correct and the position uncertainty of the first generated symbol is reduced to a minimum. This latter embodiment is only possible when the digital demodulator knows the number of header samples.

It is however possible to let the digital demodulator 10 of index i process the sample block of index i without it having knowledge of the number of synchronization or guard samples it contains. In a variant, the digital demodulators 10 are configured with these two values before their start, in the same way as the distributor 8. In another variant, which is preferred, the distributor 8 informs the different demodulators of the size of the blocks it is transmitting to them. Thus, the distributor 8 generates not only the K blocks of samples but also K sets of metadata relating to it, each set of metadata relating to the sample block of index i containing at least one of the following sizes:

the number of synchronization samples of the sample block of index i, the number of guard samples of the sample block of index i, the number of header samples of the sample block of index i, (sum of the two previous numbers), the number of samples of the sub-sequence of index i, the total number of samples of the sample block of index i (sum of two previous numbers).

It is specified here that the demodulator has the possibility of counting the samples of the block so that this latter item of information can be known to it without being transmitted to it. However this item of data will only be known once the samples of the block are consumed if one does not want the demodulator to require the use of an additional operation to establish it.

Thus, if for any reason whatsoever the synchronization implemented by the digital demodulator 10 of index i consumes samples of index i and does so in spite of the presence of the header samples in the sample block of index i, then the digital demodulator 10 has the possibility of detecting this problematic situation owing to these metadata, and implementing in this case an appropriate action (transmission of an alert signal, stopping of the digital demodulator 10 etc.) To implement such a detection, the digital demodulator 10 can simply count the samples it consumes in the sample block of index i that it has received and compare, once the synchronization is effective, this number of counted samples with the number of synchronization samples that has been supplied to it by the distributor 8 in the metadata, or by initial configuration.

In the same way, in the silent header embodiment, the demodulator does not generate any symbol before reaching the first sample of the sub-sequence, i.e. after consuming all the header samples as well as the one immediately following. This time, to implement this arrangement, the demodulator dismisses any symbol that has just been computed if the number of samples consumed has not then reached the number of header samples that has been supplied to it by the distributor 8 in the metadata (or by initial configuration) after adding a unit. This therefore guarantees that any generated symbol will then have been computed using the at the most L last samples, none of which will have been drawn from the synchronization samples preceding the guard.

The distributor 8 can also inform the digital demodulators 10 by supplying in the metadata numbering indices such as:
- The number of the block in the order of arrangement of the distributor
- The number of the order in the sequence of the first sample of the block
- The number of the order in the sequence of the first sample of the sub-sequence (after the header).

Some of these combined data make it possible to deduce from this, by subtraction, the size of the header or of the block, which then makes it possible to make economies on the transmission of these metadata. As will be seen below, these numbering metadata allow the digital demodulator 10 to form metadata for use by the reconstructing module 12.

Other data can be easily supplied by the distributor 8 to the digital demodulators 10 in the metadata, such as for example a center frequency of the sequence of digital signal samples so that these can pre-position their local oscillator to allow the rapid acquisition of the carrier synchronization.

By applying the principles described above, the K digital demodulators 10 used produce K symbol blocks on the basis of the K sample blocks they have received.

Figure 5:
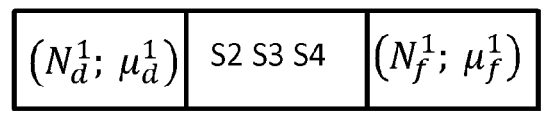
Figure 5:
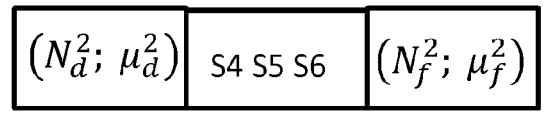

FIG. 5 shows symbol blocks obtained on the basis of the sample blocks shown in FIG. 4 (K=2). The first demodulator (of index 1) has produced a first block of symbols comprising the symbols S2 to S4, and the second demodulator (of index 2) has produced a second symbol block comprising the symbols S4 to S6.

The K symbol blocks are then transmitted to the reconstructing module 12.

The reconstructing module 12 reconstitutes an output signal from these K symbol blocks, by assembling them with one another in an order corresponding to the order in which the sub-sequences appeared in the sample sequence supplied by the analog-to-digital converter 4.

So that the reconstructing module 12 obeys this particular order of assembly of the symbol blocks, provision can be made for establishing a fixed order relation between the digital demodulators 10 of the processing device 6. In this case, it suffices for the reconstructing module 12 to know by which digital demodulator 10 a symbol block has been produced to deduce therefrom its order with respect to the other symbol blocks. This knowledge can be established by independent links between the different digital demodulators 10 and different input ports of the reconstructing module 12. In a variant, provision can be made for the reconstructing module 12 to receive ordering data from the distributor 8 so as to deduce the order of assembly of the different symbol blocks produced by the digital demodulators. Finally, the digital demodulators 10 can use the order numbering metadata they themselves have received from the distribution module to send back metadata to the reconstructing module in turn.

This gives in the output signal a sequence of symbols coming from the symbol block of index 1, followed by a sequence of symbols coming from the symbol block of index 2, . . . all the way to a sequence of symbols coming from the symbol block of index K.

In an optimal situation, two symbol blocks of successive indices i-1 and i have no symbol in common. In this situation, these two successive symbol blocks are simply concatenated during the reconstruction of the output signal.

However, a redundancy of a few symbols may exist between those produced last by the digital demodulator 10 of index i-1 on the basis of the sample block of index i-1 and those produced first by the digital demodulator 10 of index i from the sample block of index i. Thus, in the example illustrated in FIG. 5, the final symbol (last symbol) produced by the first digital demodulator 10 and the initial symbol (first symbol) produced by the second digital demodulator are both the symbol S4.

This is why the reconstructing module 12 preferably implements a step of detecting any redundancy between the last symbols of the block of index i-1 and the first symbols of the block of index i. When a symbol is redundant, the reconstructing module 12 only retains one of the two symbols in the output signal and eliminates the other.

In an embodiment, the digital demodulators 10 are not limited to producing symbol blocks, but also generate metadata making it possible to help the reconstructing module 12 to successfully complete this symbol redundancy detecting step, without seeking to directly compare these symbols.

Thus, the digital demodulator 10 of index i-1 determines a fractional position making it possible to locate the final symbol in relation to the samples in the block of index i-1. As has been seen previously, the symbols are not synchronous with the samples: the optimal time of sampling of a symbol therefore does not generally coincide with the time of a sample. This sample position can thus be a pair ($N_f^{i-1}$; $\mu_f^{i-1}$), defining a fractional number where:
- $N_f^{i-1}$ is the integer part designating the number of the last sample that immediately precedes the optimal sampling time of the final symbol. Typically, the sample in question can be a tail sample of the sample block of index i-1 corresponding to one of the guard samples of the sample block of index i.
- $\mu_f^{i-1}$ is a fractional part with a value in the interval [0,1] in relation to a sampling period. This fractional part measures the relative separation between the start of the sample immediately preceding, for example, the optimal sampling time of the final symbol, and the optimal sampling time of the final symbol itself. This value is computed by the synchronization loop of the demodulator.

In the example in FIGS. 3 to 5, $N_f^1$ is the separation (in number of samples) between the reference sample E6 and the sample E7, which is the last sample preceding the production of the final symbol of the first sample block. Moreover, the optimal sampling time of the final symbol is located approximately halfway from the start of the sample E7 and the following sample E8. This is why, in this case, the first demodulator arrives at the following values:

$$N_f^1 = 1$$

$$\mu_f^1 = 0.48$$

In the same way, the digital demodulator 10 of index i determines a fractional position making it possible to locate the symbol in relation to the samples in the block of index i. This fractional sample position can be a pair ($N_d^i$; $\mu_d^i$), defining a fractional number where:
- $N_d^i$ is the integer part designating the number of the sample which immediately precedes the optimal sampling time of the initial symbol. Typically, the sample in question can be one of the guard samples of the sample block of index i.

$\mu_d^i$ is a fractional part with a value in the interval [1,0] in relation to a sampling period. This fractional part measures the relative separation between the start of the sample immediately preceding the optimal sampling time of the initial symbol, and the optimal sampling time of the initial symbol itself. This value is computed by the synchronization loop of the demodulator.

In the example in FIGS. 3 to 5, $N_d^2$ is the separation (in number of samples) between the reference sample E7 and the sample E8, which is the first sample that the demodulator of index 1 has used, once the synchronization is effective, to produce the initial symbol of the symbol block of index 2. Moreover, the optimal sampling time of the initial symbol is located approximately a little bit closer to the sample E7 than to the following sample E8. This is why, in this case, the second demodulator arrives at the following values:

$$N_d^2=1$$

$$\mu_d^2=0.38$$

The positions with a fractional part $(N_f^i; \mu_f^i)$ and $(N_d^i; \mu_d^i)$ in relation to the order number of the samples are transmitted to the reconstructing module 12 by the digital demodulator 10 of index i.

The detection of any redundancy between the symbol blocks of respective indices i-1 and i is implemented by the reconstructing module 12 on the basis of a separation between the two central positions of symbols with a fractional part supplied.

As soon as the synchronization of rate is effective in the two digital demodulators on the blocks i and i-1 in the vicinity of these symbols, the difference between the two fractional times is of necessity close to an integer number of symbol periods Ts: $(N_d^i+\mu_d^i)-(N_f^{i-1}+\mu_f^{i-1})\approx kT_s$, the error affecting this equality being small compared to Ts. By a very simple identification of the intervals associated with each value k (it is for example possible to set the position uncertainty threshold to 1 as Ts>2 to obey the Nyquist sampling theorem), it is possible to determine this value without ambiguity, i.e. the number of periods separating the end symbols of the block i-1 and start symbols of the block i. If k is strictly greater than one, then this is because symbols have been omitted between the two blocks. An alarm can be triggered as this means that the symbols cannot be demodulated, the cause probably being that the demodulator i has undergone a synchronization error that has prevented it from supplying symbols in time. If k has a value of one, then the first symbol of the block i follows the last of the block i-1 and it is possible to concatenate the sequence of symbols of the block i directly after those of the block i-1. If k has a value of zero or is negative, then one or more redundant symbols are involved, 1-k in number. It is then advisable to dismiss these on one of the two sequences before concatenating them.

In the production of said silent header wherein the digital demodulators 10 only generate symbols after having begun the consumption of samples in the sub-sequence, then k can only have a value of 0 or 1, i.e. there is no, or only one, redundant symbol.

The redundant symbols are therefore deleted before concatenation of the two symbol blocks. This second case is the example illustrated in FIGS. 3 to 5, since |(1+0.48)−(1+0.38)|=0.1<1. Thus, one symbol is redundant and the symbol S4 is eliminated either at the start of the symbol block of index 2, or at the end of the symbol block of index 1.

Preferably, the symbol retained in the output signal out of the two redundant symbols is not chosen at random by the reconstructing module 12. As default, in a first embodiment, the symbols of the sequence i will be deleted in favor of those of the sequence i-1. This embodiment is preferred to the contrary one as it is more probable that the residual phase error of the synchronization on the block i is greater than that of the block i-1 since the acquisition thereof is more recent. These symbols are therefore probably affected by a higher error probability.

In a second embodiment, the digital demodulator 10 of index i-1 estimates a signal-to-noise ratio associated with the final symbol it produces, and the digital demodulator 10 of index i estimates a signal-to-noise ratio associated with the initial symbol it produces. These signal-to-noise ratios are then transmitted to the reconstructing module 12. In the event of redundancy, the reconstructing module 12 keeps in the output signal the redundant symbol or symbols associated with the highest signal-to-noise ratio out of the two signal-to-noise ratios that have been supplied to it by the demodulators of index i-1 and i.

In a third embodiment, the digital demodulator 10 of index i checks if the number of samples it has consumed during the first period (so up to the moment when the synchronization becomes effective, the moment from which it can produce symbols). If all the synchronization samples are consumed by the digital demodulator 10 of index i before the synchronization is effective, then the final symbol produced by the digital demodulator 10 of index i is eliminated. Otherwise, the initial symbol produced by the digital demodulator 10 of index i is included in the output signal and the final symbol produced by the digital demodulator 10 of index i-1 is eliminated.

In a manner known per se, the constellation diagram associated with most of the modulation schemes involving the phase is invariant by rotation of a fraction of a turn. This results in a phase ambiguity at the demodulator output of $2\pi/M$ where M is the order of ambiguity (2 for BPSK, 4 for QPSK for example). In a conventional demodulator operating continuously, this phase ambiguity is dispelled owing to a synchronization word or by differential encoding. However, in the processing device 6, the use of such a synchronization word would require making the different demodulators 10 communicate amongst themselves, which is not an acceptable solution as it would make the different demodulators 10 dependent on one another.

In all cases, in the acquisition period the demodulators 10 randomly lock onto different phase states and this results in an indeterminate phase rotation between the constellations of the different symbol blocks produced by these demodulators. To dispel the ambiguity, a reference phase identifiable by the demodulator is isolated, such as for example that of the first (or last or nth) symbol of a noteworthy known sequence (the synchronization word).

In the absence of a synchronization word, it is at least required for the different demodulators 10 to be able to identify their relative phase state, which will allow the reconstructing module 12 to correct this difference prior to the dispelling of ambiguity. This is why, when the signal acquired by the radio antenna turns out to be modulated by a constellation having a phase ambiguity, the digital demodulator 10 of index i estimates the phase of the carrier associated with the local oscillator of its synchronization algorithm and advantageously transmits it to the reconstructing module 12 with the metadata. Should the digital demodulator 10 of index i implement a PLL, this phase is the phase of a numerically controlled oscillation (NCO) of this PLL. For the reconstructing module to be able to correct the phase rotation between two consecutive blocks, it is then enough for the phase to have been measured at two identical times, at once in the block i-1 and the block i. For this it is therefore necessary, in each block, for example, to transmit the value of the phase of the synchronized carrier at the times corresponding to the last sample of the guard and to the last sample of the block.

The last sample of the block i-1 is the same as the last sample of the header of the block i. For an established regime, the synchronization PLLs of the carrier frequency of the demodulators 10 for the block i-1 and the block i are locked with the same instantaneous frequency and a phase that can only differ by $2k\Pi/m$ where m is the order of ambiguity. If the phase of the OL of the demodulator i is $\phi_i$ and that of the demodulator of the block i-1 $\phi_{i-1}$, then we of necessity have $\phi_i-\phi_{i-1} \approx 2k\Pi/m$ and the symbols demodulated by the demodulator of the block i have undergone a rotation of $-2k\Pi/m$ with respect to those of the block i-1. The value of k must therefore be determined with the k/m closest to $(\phi_i-\phi_{i-1})/2\Pi$ and carry out a rotation of $2k\Pi/m$ on the symbols coming from the block i to align them on those of the block i-1. Thus, the reconstructing algorithm only makes a correction for the block 0, then from neighbor to neighbor, performs a rotation on the symbols originating from the block i which accumulates the rotation phase previously carried out on the symbols coming from the block i-1 with $2k\Pi/m$, the value closest to $\phi_i-\phi_{i-1}$ which is the phase difference as defined above between the last sample of the header of the block i and the last sample of the block i-1.

Preferably, the digital demodulator 10 of index i generates a frame containing not only the symbol block that it has produced on the basis of the sample block of index i, but also containing a set of metadata. This set of metadata can comprise:
- the fractional position in relation to the samples and the signal-to-noise ratio associated with the final symbol produced by this demodulator. Preferably, these metadata are included in a suffix that follows the symbol block of index i in the frame.
- the fractional position in relation to the samples and the signal-to-noise ratio associated with the initial symbol produced by this demodulator. Preferably, these metadata are included in a prefix that precedes the symbol block of index i in the frame.
- the phase of the carrier synchronized by the demodulator at the time of the last sample of the guard.
- the phase of the carrier synchronized by the demodulator at the time of the last sample of the block.

The frame is then sent to the reconstructing module 12. Thus, it is on the basis of the content of the K frames that it receives (metadata and symbols) that the reconstructing module 12 reconstructs the output signal.

Of course, all the processing implemented by the reconstructing module 12 is repeated K-1 times, for each pair of symbol blocks of consecutive indices i-1 and i. Thus, K-1 detections of any redundancy are implemented, in the same way as K-1 concatenations, and at the most K-1 phase adjustments.

All the preceding steps can be repeated over time for several sample sequences produced by the analog-to-digital converter 4. In particular, it should be noted that the symbol block of index K constructed from a given sample sequence and the symbol block of index 1 constructed from a following sample sequence are assembled according to the same logic as that previously described within one and the same sequence.

The invention is not limited to just the embodiments detailed above.

Thus, the K sample blocks formed by the distributor 8 can be of identical or different sizes, have synchronization samples in identical or different number, and have guard samples in identical or different number.

In a variant embodiment, the metadata supplied by the demodulator to the reconstructing module can be computed at slightly shifted times or even variable over time, as long as they have been computed at the end of the header for the start metadata and at the end of any block for the end metadata, the variation region being able to be of a few symbol periods. In this case, it is important that the exact time-stamping (accurate to a sample fraction) accompanies each item of metadata. The reconstructing module that wants to make use of them must then complete a step of extrapolating the metadata to make them coincide at identical times for two consecutive blocks. For example, the carrier frequency of the synchronization OL is preserved by extrapolation as it varies slowly, the phase of this carrier is extrapolated by a linear formula using the carrier frequency as the gradient of variation over time, the position of a symbol center can be shifted to the adjacent symbols by the addition or subtraction of one symbol period (known by the reconstructing module).

It is also possible to use another time base for the time-stamping of the samples and the metadata than the sampling rate, i.e. the order number and the relative fractional part in the sample sequence. The metadata coming from the demodulators are then accompanied by their time stamp in this time base.

This method makes it possible to envision the use of sample blocks coming from different hardware items that have been remotely synchronized by the same time base. In particular, in another mode of operation, the sequence of digital signal samples passed to the distributor 8 as input can have been produced by several independent analog-to-digital converters, on the basis of the same modulated analog signals previously acquired by different radio antennas.

3/Test results

The preceding method was tested with a processing device equipped with two Intel Xeon 5130 processors operating at a frequency of 2.00 GHz. With a single digital demodulator, a throughput of 10 Mbits/s was reached. However, by adding a second digital demodulator in parallel with the first, the throughput is increased and has reached 16 Mbits/s (with an overlap of 1/10 of the total of the samples).

This same test has been carried out on a machine equipped with an Intel Xeon E3-1220-v3 processor operating at a frequency of 3.10 GHz.

Figure 6:
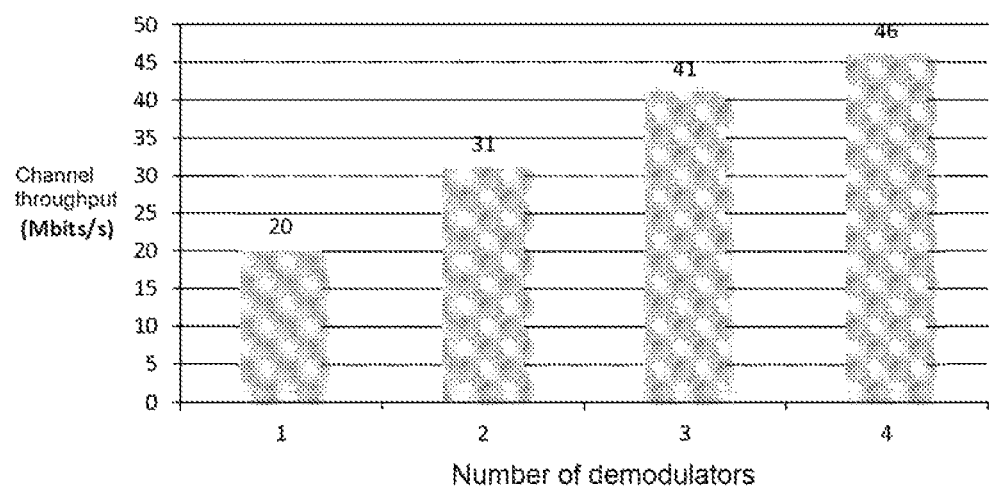
FIG. 6 is a diagram showing throughputs obtained by means of this method as a function of a number of demodulators used in parallel.

With reference to FIG. 6, there is a ratio of 1.6 between the performances obtained with a single demodulator and those obtained with two demodulators in parallel. By further increasing the number of demodulators, this ratio becomes even more significant.

The invention claimed is:

1. A method comprising:
receiving a sequence of digital signal samples coming from at least one modulated analog signal, the sequence of digital signal samples comprising a first sample sub-sequence and a second sample sub-sequence different from the first sample sub-sequence;
forming a first sample block comprising the first sample sub-sequence, wherein the first sample sub-sequence comprises tail samples of the first sample block;
forming a second sample block comprising header samples followed by the second sample sub-sequence, wherein the header samples correspond to the tail samples;

demodulating the first sample block by a first digital demodulator, so as to produce a first symbol block;

demodulating the second sample block by a second digital demodulator independent of the first digital demodulator so as to produce a second symbol block, the second digital demodulator implementing a carrier and/or symbol rate synchronization, and taking as input the second sample block starting with the header samples, the header samples comprising synchronization samples in a suitable number for the synchronization to be effective before the second digital demodulator starts to demodulate the second sample sub-sequence; and reconstructing an output symbol sequence by concatenating a symbol sequence coming from the first symbol block with a symbol sequence coming from the second symbol block.

2. The method of claim 1, wherein the header samples further comprise guard samples located, in the second sample block, between the synchronization samples and the second sample sub-sequence, the guard samples being of a number greater than a maximum number of samples per symbol in the sequence of digital signal samples.

3. The method of claim 1, wherein the second digital demodulator having received the second sample block does not produce symbols as long as the header samples have not been consumed by the second digital demodulator.

4. The method of claim 1, further comprising:
generating, by the first digital demodulator, a first set of metadata relating to the first symbol block; and
generating, by the second digital demodulator, a second set of metadata relating to the second symbol block, wherein the output symbol sequence is reconstructed using the first set of metadata and the second set of metadata.

5. The method of claim 4, further comprising:
detecting a redundancy between at least one symbol of the first symbol block and at least one symbol of the second symbol block, using the first set of metadata and the second set of metadata; and
for at least one pair of symbols detected as being redundant, retaining in the output symbol sequence of only one out of the two symbols of the pair.

6. The method of claim 5, further comprising estimating a signal-to-noise ratio associated with the first symbol block, and a signal-to-noise ratio associated with the second symbol block, the symbol retained in the output signal out of two redundant symbols being the one that comes from a symbol block associated with a highest signal-to-noise ratio among the estimated signal-to-noise ratios.

7. The method of claim 5, wherein the symbol sequence coming from the second symbol block follows the symbol sequence coming from the first symbol block in the output symbol sequence, and wherein the symbol retained in the output sequence out of two redundant symbols is the redundant symbol of the first symbol block.

8. The method of claim 4, wherein
the first set of metadata comprises a first position determined by the first digital demodulator and locating a final symbol in the first sample block;
the second set of metadata comprises a second position ($N_d^2$; $\mu_d^2$) determined by the second digital demodulator and locating an initial symbol in the second sample block; and
the number of redundant blocks between the first symbol block and the second symbol block is computed as a function of a separation between the first position and the second position.

9. The method of claim 4, further comprising:
generating, by the first digital demodulator, a first frame comprising the first symbol block and the first set of metadata; and
generating, by the second digital demodulator, a second frame comprising the second symbol block and the second set of metadata.

10. The method of claim 9, wherein the first set of metadata forms a suffix that follows the first symbol block in the first frame, and wherein the second set of metadata forms a prefix followed by the second symbol block in the second frame.

11. The method of claim 1, further comprising:
estimating, by the first digital demodulator, a first synchronized carrier phase associated with the first symbol block;
estimating, by the second digital demodulator, a second synchronized carrier phase associated with the second symbol block; and
if the two phases of synchronized carrier synchronization differ by a phase difference, adjusting one of the first symbol block and the second symbol block in relation to the other of the first symbol block and the second symbol block, so as to eliminate the phase difference before reconstructing the output symbol sequence.

12. The method of claim 11, further comprising:
generating, by the first digital demodulator, a first set of metadata relating to the first symbol block; and
generating, by the second digital demodulator, a second set of metadata relating to the second symbol block, wherein the output symbol sequence is reconstructed using the first set of metadata and the second set of metadata, and wherein the first synchronized carrier phase is included in the first set of metadata and the second synchronized carrier phase is included in the second set of metadata.

13. The method of claim 1, further comprising
generating metadata relating to the second sample block, comprising a total number of samples of the second sample block and/or a number of synchronization samples of the second sample block and/or a center frequency of the sequence of digital signal samples; and
transmitting said metadata to the second digital demodulator.

14. The method of claim 1, further comprising:
determining a frequency offset between a center frequency of the sequence of digital signal samples and an expected center frequency; and
correcting the sequence of digital signal samples from the frequency offset to remove the frequency offset in the sequence of digital signal samples before forming the first sample block and the second sample block, or else correcting one of the first sample block and the second sample block by one of the first digital demodulator and the second digital demodulator.

15. A non-transitory computer-readable medium comprising code instructions for causing a computer to perform the method as claimed in claim 1.

16. A device comprising:
a distributor configured to
receive a sequence of digital signal samples coming from at least one modulated analog signal, the sequence of digital signal samples comprising a first sample sub-sequence and a second sample sub-sequence different from the first sample sub-sequence, form a first sample block comprising the first sample sub-sequence, wherein the first sample sub-sequence comprises tail samples of the first sample block, and form a second sample block comprising header samples followed by the second sample sub-sequence, wherein the header samples correspond to the tail samples, a first digital demodulator configured to demodulate the first sample block so as to produce a first symbol block;

a second digital demodulator independent of the first digital demodulator and configured to demodulate the second sample block so as to produce a second symbol block, the second digital demodulator being configured to implement a carrier and/or symbol rate synchronization, and to take as input the second sample block starting with the header samples, the header samples comprising synchronization samples in a suitable number for the synchronization to be effective before the second digital demodulator starts to demodulate the second sample sub-sequence; and a reconstructing module configured to reconstruct an output symbol sequence by concatenating a symbol sequence coming from the first symbol block with a symbol sequence coming from the second symbol block.

* * * * *